(12) United States Patent
Shiomi et al.

(10) Patent No.: US 8,472,789 B2
(45) Date of Patent: Jun. 25, 2013

(54) IMAGE EDITING APPARATUS, IMAGE EDITING METHOD, AND IMAGE EDITING PROGRAM

(75) Inventors: Hidetaka Shiomi, Osaka (JP); Shinya Takeda, Osaka (JP)

(73) Assignee: Panasonic Corporation, Osaka (JP)

( * ) Notice: Subject to any disclaimer, the term of this patent is extended or adjusted under 35 U.S.C. 154(b) by 16 days.

(21) Appl. No.: 13/251,383

(22) Filed: Oct. 3, 2011

(65) Prior Publication Data
US 2012/0082437 A1   Apr. 5, 2012

(30) Foreign Application Priority Data

Oct. 5, 2010   (JP) .................................. 2010-225335
Mar. 18, 2011   (JP) .................................. 2011-060375

(51) Int. Cl.
*H04N 5/93* (2006.01)
(52) U.S. Cl.
USPC ...... 386/281; 386/290; 386/280; 375/240.01; 719/328; 719/330
(58) Field of Classification Search
USPC ...... 386/281, 290, 280; 375/240.01; 719/332, 719/328, 330
See application file for complete search history.

(56) References Cited

U.S. PATENT DOCUMENTS

| | | | | |
|---|---|---|---|---|
| 6,154,208 A | * | 11/2000 | Otala | 715/866 |
| 6,549,918 B1 | * | 4/2003 | Probert et al. | 1/1 |
| 7,640,555 B1 | * | 12/2009 | Prabhu et al. | 719/332 |
| 2002/0165930 A1 | * | 11/2002 | Theriault et al. | 709/214 |
| 2006/0114327 A1 | | 6/2006 | Araya et al. | |
| 2006/0232708 A1 | * | 10/2006 | Kawa et al. | 348/569 |
| 2009/0080854 A1 | * | 3/2009 | Arai | 386/52 |
| 2012/0019694 A1 | * | 1/2012 | Tin | 348/273 |

FOREIGN PATENT DOCUMENTS

| | | |
|---|---|---|
| JP | 5-122681 | 5/1993 |
| JP | 3133113 | 2/2001 |
| JP | 2006-107585 | 4/2006 |
| JP | 2006-157197 | 6/2006 |
| JP | 4385913 | 12/2009 |

OTHER PUBLICATIONS

"AVCHD" From Wikipedia, the free encyclopedia, htt;://en.wikipedia.org/wiki/AVCHD, Sep. 8, 2011.

* cited by examiner

*Primary Examiner* — Helen Shibru
(74) *Attorney, Agent, or Firm* — Wenderoth, Lind & Ponack, L.L.P.

(57) ABSTRACT

The present invention provides an image editing apparatus which decreases a CPU load required for previewing a group of finished images used for continuous presentation, such as a photo movie, and reduces a processing time. The image editing apparatus includes an image obtaining unit obtaining material images; a converting unit carrying out conversion on an image, included in the material images, of which load required for playback is greater than a predetermined load reference, the conversion additionally creating a proxy image corresponding to the image and having a smaller load required for the playback; and a preview playback unit playing back, as a preview, the proxy image and material images which are included in the material images and are other than the image corresponding to the proxy image in a predetermined order.

13 Claims, 10 Drawing Sheets

FIG. 8

| Moving image format | Resolution | Bit rate | Load level |
|---|---|---|---|
| AVCHD | 1920 x 1080 | 17 Mbps | 5 |
| AVCHD | 1920 x 1080 | 12 Mbps | 4 |
| AVCHDLite | 1280 x 720 | 17 Mbps | 4 |
| AVCHDLite | 1280 x 720 | 12 Mbps | 4 |
| AVCHDLite | 1280 x 720 | 9 Mbps | 4 |
| MOV | 1280 x 720 | 50 Mbps | 3 |
| MOV | 834 x 480 | 20 Mbps | 3 |
| MOV | 640 x 480 | 15 Mbps | 2 |
| MOV | 320 x 240 | 3 Mbps | 1 |

IMAGE EDITING APPARATUS, IMAGE EDITING METHOD, AND IMAGE EDITING PROGRAM

BACKGROUND OF THE INVENTION (1) Field of the Invention

The present invention relates to image editing apparatuses and, in particular, to an image editing apparatus capable of editing an image.

(2) Description of the Related Art

It is known that there are image editing apparatuses and image editing programs which can easily edit materials such as obtained still image data and video data. For example, Patent Reference 1 (Japanese Unexamined Patent Application Publication No. 2006-157197) discloses a photo movie creating apparatus for creating a photo movie made of still images with dynamic visual effects added thereto, and gives the images various stories.

SUMMARY OF THE INVENTION

When a user creates a slide show including moving images and still images, the user would sometimes desire to preview the resulting slide show in order to check its finishing before outputting a file of the created slide show. Here, depending on the difference among file formats and the degree of resolutions of the moving Images and the still images included in a photo movie and a slide show, some central processing units (CPUs) would be short of enough playback capacity for the preview. Thus, when the user desires to have a smooth preview for the check, he or she has to use an image editing apparatus including a high performance CPU.

The present invention is conceived in view of the above problems, and has an object to provide an image editing apparatus capable of decreasing a CPU load required for previewing a group of finished images for continuous presentation, such as a photo movie in order to further reduce the processing time.

An image editing apparatus according to an aspect of the present invention includes: an image obtaining unit which obtains material Images; a converting unit which (i) carries out conversion on an image, included in the material images, of which load required for playback is greater than a predetermined load reference, and (ii) avoids carrying out the conversion on an image, included in the material images, of which load required for the playback is equal to or smaller than the load reference, the conversion additionally creating a proxy image corresponding to the image and having a smaller load required for the playback; and a preview playback unit which plays back, as a preview, the proxy image and material images which are included in the material images and are other than the image corresponding to the proxy image in a predetermined order.

According to the structure, for an image having a playback load of the preview playback unit greater than the predetermined reference, the image editing apparatus can create a proxy image having a smaller playback load depending on the processing capacity of the CPU included in the image editing apparatus, and can playback the preview. For an image having a playback load of the preview playback unit smaller than the predetermined reference, the image editing apparatus can omit creating an unnecessary proxy image in order to skip a process necessary for resizing, decoding, and encoding a moving image. As a result, the image editing apparatus can decrease a CPU load required for previewing a group of finished images used for continuous presentation, such as a photo movie, and reduces a processing time of the image editing apparatus. Furthermore, the user of the image editing apparatus can check the preview more smoothly.

The converting unit may determine the load reference based on the playback capacity, of the preview playback unit, which is previously measured.

Specifically, the converting unit may determine the load reference such that the load reference is greater as the playback capacity is higher.

Thus, a higher playback capacity of the preview playback unit provides a greater load reference. The converting unit additionally creates a proxy image only for a moving image whose load required for the playback is greater than the load reference. Thus, a greater load reference can minimize the creation of the proxy images. As a result, the image editing apparatus 100 can reduce the processing time required for the playback of the preview.

For an image having a load required for the playback greater than the load reference, said converting unit may convert a file format of the image into a file format having a smaller load required for the playback to create the proxy image.

For an image having a load required for the playback greater than the load reference, the converting unit may convert the image into an image having a smaller resolution or a smaller bit rate to create the proxy image.

For an image having a load required for the playback greater than the load reference, the converting unit may convert the image into an image having a load required for the playback smaller than the load reference to create the proxy image.

Thus, regardless of the processing capacity of the CPU included in the image editing apparatus 100, the preview on the image editing apparatus 100 can optimize both of the conflicting factors, the smoothness of the playback and the quality of image to be played back. The converting unit may (i) store in association with each of pieces of attribute information corresponding to one of images including the image and a corresponding one of load levels indicating a load required for playback of the one image including the corresponding piece of the attribute information, and, for an image having the one load level greater than the load reference, (ii) convert the image into an image having one of the pieces of the attribute information corresponding to a lowest load level among the load levels to generate the proxy image.

Thus, regardless of the processing capacity of the CPU included in the image editing apparatus 100, the image editing apparatus 100 can certainly prevents frames from dropping in playback, and can provide a smooth playback.

The converting unit may (i) determine whether or not there is the image, of which load required for the playback is greater than the load reference, in the obtained material images, and (ii) carry out the conversion only on the image having the load greater than the load reference, the determination being carried out in one of cases when (i) a new image is added to the material images, (ii) a user confirms the material images and an order of displaying the material images, and (iii) the converting unit receives an instructions from the user.

Thus, even though the image to be previewed is changed due to the edition of the story, the converting unit can carry out conversion into a necessary proxy image.

When a user gives an instruction to cancel the conversion while the converting unit is carrying out the conversion, the converting unit may cancel the conversion, and the preview playback unit may play back the proxy image and the material images other than the image corresponding to the proxy image in the predetermined order, the proxy image being created by the converting unit the cancelation of the conversion.

This operation allows the user who does not have to have the preview to cut the processing time required for creating the story for a preview (mainly, creating a proxy image). Furthermore, when there is no need for a preview, the original story can be immediately displayed without creating the story for preview.

An image editing system according to another aspect of the present invention includes: the image editing apparatus; and an original story creating unit configured to play back each of images included in the material images in the predetermined order.

Moreover, instead of being provided as the image editing apparatus, the present invention may be provided as an image editing method including, as steps, characteristic units included in the image editing apparatus, and a computer program which causes a computer to execute such characteristic steps. Such a program may be distributed via a recording medium including a compact disc read only memory (CD-ROM), and a transmitting medium including the Internet.

Furthermore, In the present invention, a part or all of the functions of the image editing apparatus may be configured from a large scale integration (LSI), and may be provided as an image editing system including the image editing apparatus.

The present invention provides an image editing apparatus capable of (i) decreasing a CPU load required for previewing a group of finished images used for continuous presentation, such as a photo movie, and (ii) reducing a processing time.

FURTHER INFORMATION ABOUT TECHNICAL BACKGROUND TO THIS APPLICATION

The disclosures of Japanese Patent Application No. 2010-225335 filed on Oct. 5, 2010, and Japanese Patent Application No. 2011-060375 filed on Mar. 18, 2011 including specification, drawings and claims is incorporated herein by reference in their entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 8 depicts a schematic view showing a moving image file format table according to the embodiment;

DESCRIPTION OF THE PREFERRED EMBODIMENT

Described hereinafter in detail is an image editing apparatus according to an embodiment of the present invention with reference to the drawings.

Figure 1:
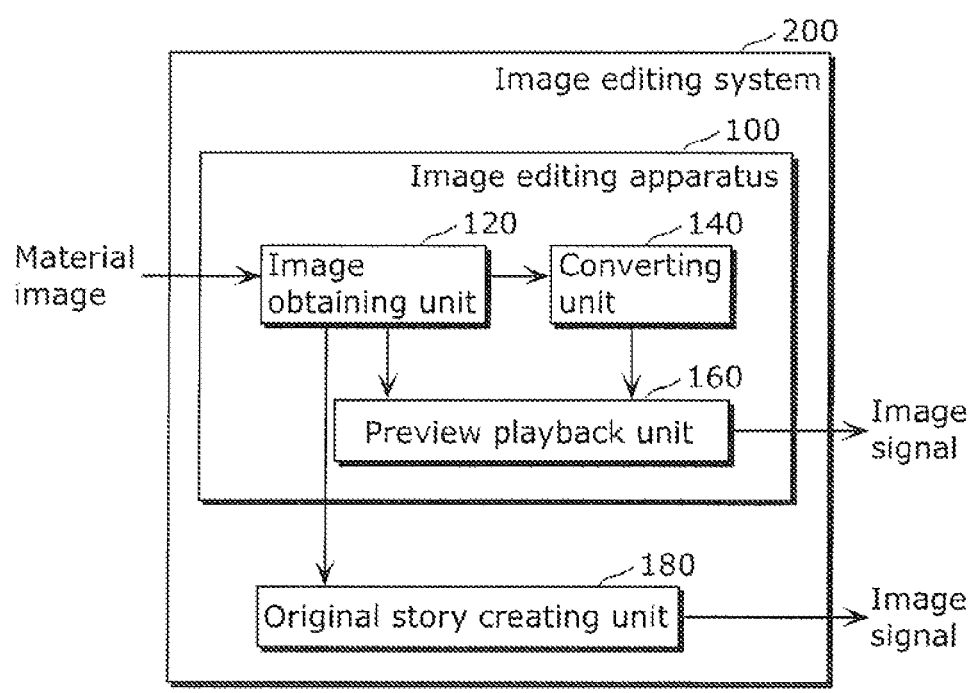
FIG. 1 depicts a block diagram showing a structure of an image editing system according to an embodiment.

FIG. 1 depicts a block diagram showing a structure of an image editing system 200 including an image editing apparatus 100 according to the embodiment of the present invention.

The image editing system 200 creates a photo movie from material images including moving images, and plays back the created photo movie. It is noted that the material images may include still images, as well as the moving images. Hereinafter, the moving image and the still image are both referred to as "image".

In creating the photo movie on the image editing system 200, the user can employ default BGM and any given BGM registered by the user.

Specifically, in order to create the photo movie, the image editing system 200 according to the embodiment continuously plays back material images provided by the user according to a template and BGM selected by the user.

Here, the template is electronic data in which a combination of (i) a display time of each of the images included in the continuously played back material images, (ii) a switching effect between material images, and (iii) BGM is broken down into patterns in a re-usable form. The user creates a concrete photo movie by putting the material images and the BGM to the template and changing a predetermined switching effect.

Here, there is information which concretely specifies all the items required for playing back the photo movie, such as which template is used and which moving images are arranged in which orders, with which switching effect, at which playback time, with which BGM. Such information is hereinafter referred to as story information.

The template may be previously stored in a storage medium included in the image editing system 200, such as a Random Access is Memory (RAM), a Read Only Memory (ROM), and a Static Random Access Memory (SRAM). The user may separately obtain the template, and may add and update the template to and in the image editing system 200.

As shown in FIG. 1, the image editing system 200 includes an original story creating unit 180 and the image editing apparatus 100.

According to a condition specified by the story information, the original story creating unit 180 creates the photo movie by continuously playing back each of the images included in the material images.

The photo movie created by the image editing system 200 as described above is hereinafter referred to as "story". In other words, the story is a moving image in which material images are sequentially arranged by the image editing system 200 according to the condition specified by the story information.

The image editing apparatus 100 creates to playback a preview. Here, the preview is a moving image for check so that the user checks the story created by the image editing system 200.

The image editing apparatus 100 includes an image obtaining unit 120, a converting unit 140, and a preview playback unit 160.

The image obtaining unit 120 obtains material images. The material images are selected by the user via, for example, the Graphical User Interface (not shown) included in the image editing system 200.

The converting unit 140 carries out conversion on a moving image, included in the material images obtained by the image obtaining unit 120, of which load required for playback is greater than a predetermined load reference. Here, the conversion is to additionally create a proxy image which corresponds to the moving image and has a smaller load required for the playback. Concurrently, the converting unit 140 avoids carrying out the conversion on a moving image, included in the material images, of which load required for the playback is equal to or smaller than the load reference.

Here, the converting unit 140 determines the load reference based on the playback capacity, of the preview playback unit 160, which is previously measured. In other words, the converting unit 140 determines the load reference such that the load reference is greater as the playback capacity is higher.

In a predetermined order, the preview playback unit 160 playbacks, as a preview, the proxy image and material images which are included in the material images and are other than the image corresponding to the proxy image (in other words, the moving image of which the proxy image is made by the converting unit 140).

Here, to "playback as a preview" means that sequentially-arranged material images and at least one proxy image are played back as a story. The preview playback means that the preview playback unit 160 plays back the preview which includes the sequentially-arranged material images and at least one proxy image.

Figure 2:
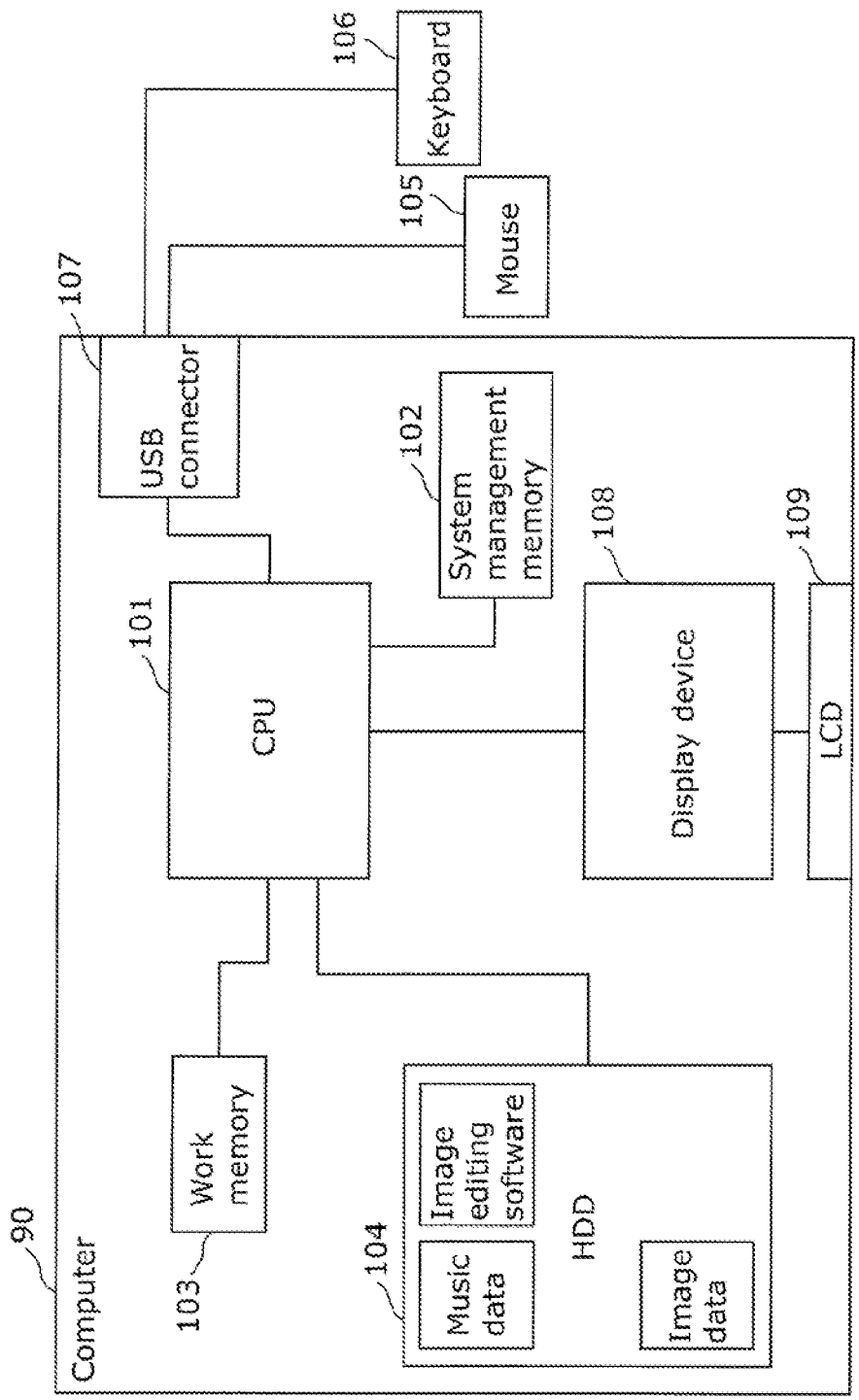
FIG. 2 depicts a block diagram showing a hardware structure of a computer implementing an image editing system including the image editing apparatus according to the embodiment.

Next, FIG. 2 details the structure and the operations of the system of the image editing apparatus 100.

FIG. 2 depicts a block diagram showing a hardware structure of a computer 90 implementing the image editing system 200 including the image editing apparatus 100 according to the embodiment.

The computer 90 works as the image editing apparatus 100 and the image editing system 200, and includes a CPU 101, a system management memory 102, a work memory 103, a hard disc drive (HDD) 104, a mouse 105, a keyboard 106, a universal serial bus (USB) connector 107, a display device 108, and an LCD 109.

The CPU 101 is an arithmetic processing unit which executes processing of each structural unit included in the image editing apparatus 100 and the image editing system 200. The CPU 101 is electrically connected with the system management memory 102, the work memory 103, the HDD 104, the display device 108, and the USB connector 107. The CPU 101 can change a screen to be displayed on the LCD 109 via the display device 108. The CPU 101 receives information on the user operation from the mouse 105 and the keyboard 106 via the USB connector 107. Even though it is not shown, the CPU 101 has overall control of the system which supplies electricity to each unit in the image editing apparatus 100 and the image editing system 200.

The system management memory 102 holds an operating system (OS). The system management memory 102 stores a system time. The system time is updated when the CPU 101 activates the OS program.

The work memory 103 temporarily stores information necessary for the CPU 101 to execute various processing operations. Through the CPU 101, the work memory 103 stores (i) information corresponding to each of "boxes" arranged in a story board area, and (ii) output file format information. Moreover, the work memory 103 has two or more storage areas with respect to the number of the "boxes".

Here, the "box" is an area in which each of the moving images or the still images, included in the material images forming the story, can be assigned in the after-described story board area. Then, the work memory 103 stores after-described box information in each of the storage areas. The CPU 101 obtains the box information stored in each of the storage areas, and updates the obtained box information.

The work memory 103 stores the output file format information required by the user when the story is encoded and the file is outputted. An output file format includes an output video format, an output audio format, and an output multiplex format. The output file format includes, for example, AVCHD and MPEG-2. The CPU 101 encodes image data according to the output file format stored in the work memory 103. It is noted that the user may select any given output file format. When the output file format to be selected by the user is changed, the output file format to be stored in the work memory 103 is also changed. According to the output file format selected by the user, the CPU 101 outputs a moving image file showing a finished story in a sequence of stream.

It is noted that, for example, a RAM, a ROM, and an SRAM may be used as the system management memory 102 and the work memory 103.

The HDD 104 is a high-capacity disc drive for storing image data. Furthermore, the HDD 104 stores an executable file of a program executing a function of each of processing units included in the image editing apparatus 100 and the image editing system 200. According to an activation instruction by the user to the image editing system 200, the CPU 101 expands the executable file stored in the HDD 104 in the work memory 103. Hence, the CPU 101 can execute a processing operation of each processing unit included in the image editing system 200. Moreover, the HDD 104 can store image data and music data which can be selected as a material image. The CPU 101 can access HDD 104 on receiving an operation from the user, and on a need-to-access basis.

The mouse 105 is a pointing device which the user uses in editing. The user operates the mouse 105 in order to select the material images, change the order of the material images, and set an editing effect of the story on after-described operation screens of the image editing system 200.

The keyboard 106 is used by the user for entering letters in editing.

The USB connector 107 is used for connecting the mouse 105 and the keyboard 106 with the image editing system 200.

The display device 108 is used for converting screen information calculated on the CPU 101 into an image (a video card, for example). The display device 108 provides an image signal, that is the screen information, to the LCD 109.

The LCD 109 is a display device for displaying the screen information converted into the image by the display device 108. It is noted that the LCD 109 is an example of the display device. Another display device, such as a cathode ray tube (CRT) and a plasma display, may also be used.

Figure 3:
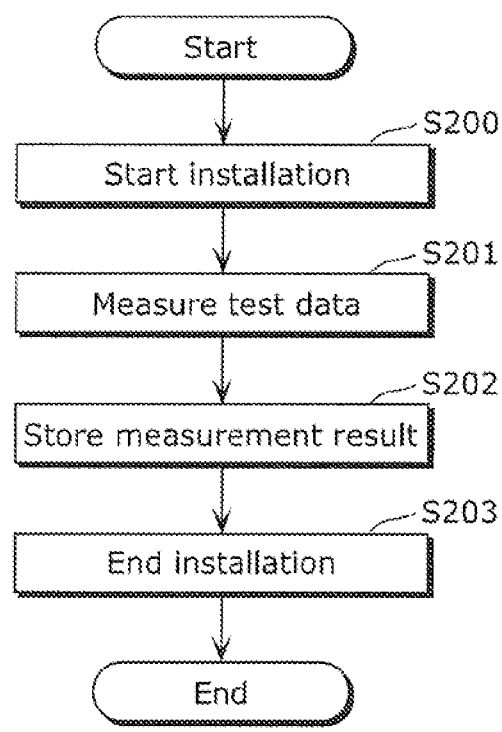
FIG. 3 depicts a flowchart showing a flow of a process for measuring performance regarding a processing capacity of a preview playback unit in playing back a moving image according to the embodiment.

With reference to FIG. 3, described next is a sequence of how to measure the performance of the preview playback unit 160 playing back a story (in other words, the processing capacity of the preview playback unit 160 in playing back the moving image included in the material images). It is noted that the processing capacity of the preview playback unit 160 in playing back the moving image typically depends on the processing capacity of the CPU 101 included in the computer 90. Thus, the processing capacity of the preview playback unit 160 is regarded as that of the CPU 101.

FIG. 3 depicts a flowchart showing a flow of a process for measuring performance regarding a processing capacity of a preview playback unit 160 in playing back a moving image according to the embodiment. It is noted that, here, the image editing apparatus 100 and the image editing system 200 according to the embodiment are assumed to be implemented when provided as a program and executed by the computer 90.

The user may obtain an installer of the image editing system 200 including the image editing apparatus 100 according to the embodiment from a storage medium including a CD and a DVD. The user may also download the installer via the Internet. The installer can be obtained or downloaded along with or aside from the image editing system 200.

When the user instructs the computer 90 to install the image editing system 200, the CPU 101 expands the obtained installer in the work memory 103 and installs the image editing system 200 in order to make the image editing system 200 according to the embodiment available (S200).

Here, the installer includes test data for measuring the processing capacity of the preview playback unit 160 in playing back the moving image. The installer uses the test data to measure the processing capacity of the preview playback unit 160 in playing back the moving image (S201). Specifically, the installer causes the preview playback unit 160 to decode one or more kinds of test data, and measures a time required to finish decoding. The test data to be used here desirably includes two or more kinds of video data having the same playback time and different loads required for the playback, such as five-second video data in AVCHD 60$i$ and five-second video data in AVCHD 30P.

Then, from the measurement result, the installer determines the playback capacity of the preview playback unit 160 in a scale of several levels, and stores the determined level in the HDD 104 (S202). As an example, the installer may determine the measurement result on the scale of Level 1 to Level 5 as defined below.

Level 5:
The condition to be met: when five-second test data is decoded on AVCHD 60$i$, the decoding of the test data shall finish within three seconds.

Level 4:
The condition to be met: when five-second test data is decoded on AVCHD 60$i$, the decoding of the test data shall finish within four seconds.

Level 3:
The condition to be met: when five-second test data is decoded on AVCHD 30P, the decoding of the test data shall finish within four seconds.

Level 2:
The condition to be met: when five-second test data is decoded on AVCHD 10P, the decoding of the test data shall finish within four seconds.

Level 1:
The playback capacity does not meet any of the above.

In the above five-level determination, Level 5 denotes that the preview playback unit 160 (in other words, the CPU 101 included in the computer 90) has the highest playback capacity, and Level 1 denotes that the preview playback unit 160 has the lowest playback capacity.

It is noted that the installer may, in advance, have test data for all of the file format, the resolution, and the bit rate of a moving image to be played back by image editing software, and measure the playback capacity by the preview playback unit 160 using the test data. Moreover, when finishing measuring the playback capacity of the preview playback unit 160 using the test data in AVCHD 60$i$, the installer may employ the measurement result to estimate the playback capacity of the preview playback unit 160 regarding the file format, the resolution, and the bit rate of another moving image.

Hence, when obtaining a performance level (in other word, the playback capacity) regarding the file format, the resolution, and the bit rate of the moving image to be played back by the image editing software, the installer stores the obtained result in the HDD 104.

As described above, when the playback capacity (in other words, the processing capacity of the CPU 101) of the preview playback unit 160 is measured, and the image editing system 200 is ready to use on the computer 90, the installer finishes installing the image editing system 200 (S203).

It is noted that, here, the installer of the image editing system 200 measures the playback capacity of the preview playback unit 160; instead, a processing unit other than the installer may executes the measurement. For example, the preview playback unit 160 itself, as well as any given processing unit included in the image editing system 200, may measure the playback capacity. Furthermore, the playback capacity may be previously stored in the HDD 104 included in the image editing system 200 when the image editing system 200 is manufactured.

Described next is the operation screens of the image editing system 200 according to the embodiment.

Figure 4:
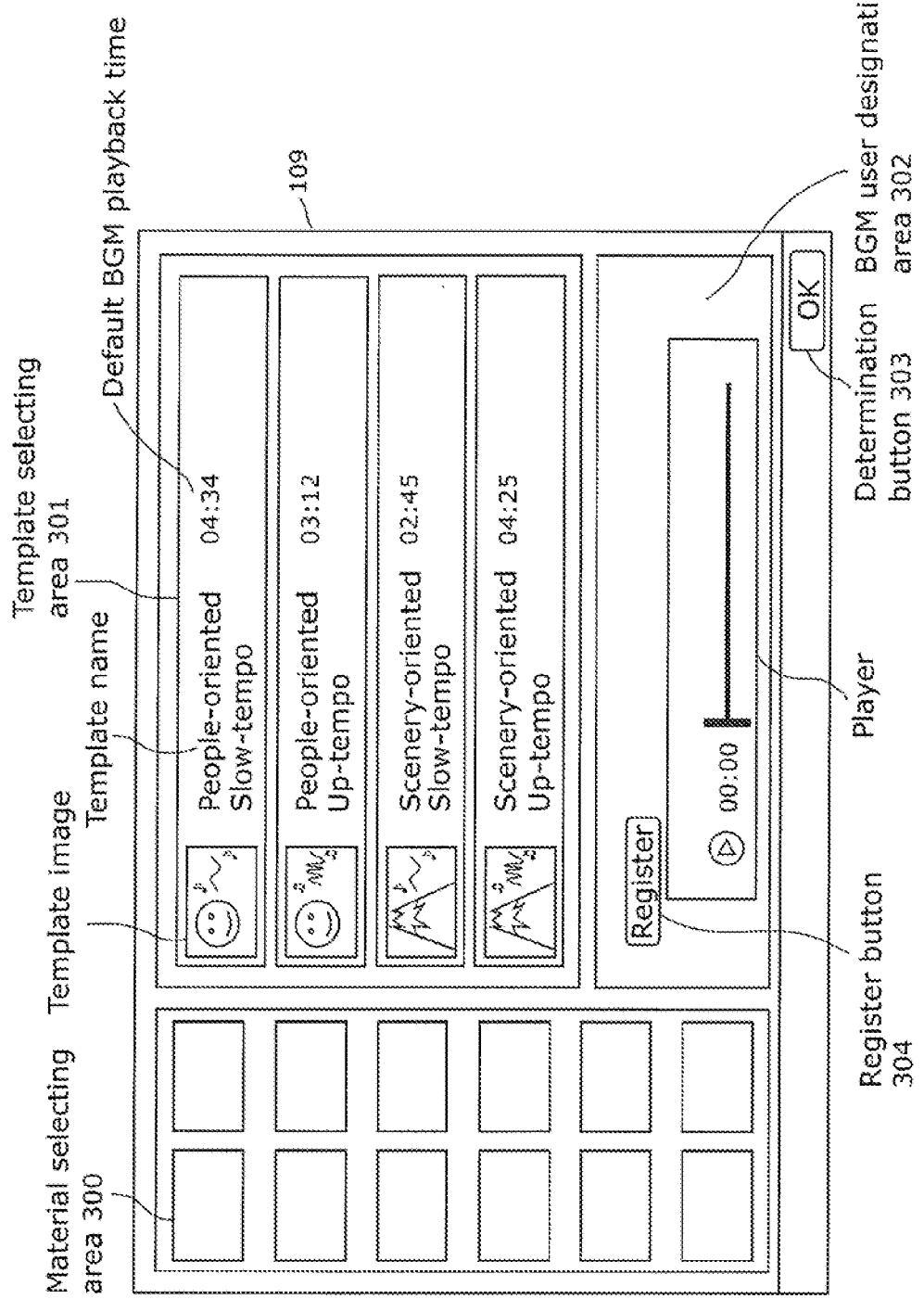
FIG. 4 depicts a selection screen appearing on a liquid crystal display (LCD) included in the image editing system according to the embodiment.

FIG. 4 depicts a "selection screen" appearing on the LCD 109. On the "selection screen", the user selects a material image, a template, and BGM for creating a story.

As shown in FIG. 4, the selection screen appearing on the LCD 109 includes a material selecting area 300, a template selecting area 301, a BGM user designating area 302, a determination button 303, and a register button 304.

The material selecting area 300 is for displaying a moving image to be used as a material for creating a story. As shown in FIG. 4, two or more images are displayed in the material selecting area 300. From among the images displayed in the material selecting area 300, the user selects material images for organizing the story to be created.

The images to be displayed in the material selecting area 300 may be either (i) all of the images corresponding to the video data stored in the HDD 104 or (ii) only selectively extracted images corresponding image data stored in a specific folder. The images to be displayed in the material selecting area 300 may also be extracted images corresponding to video data further selected by the user (via the GUI, for example) from among video data stored in a specific folder. It is noted that, for the moving images displayed in the material selecting area 300, the user may choose priorities over the moving images which the user desires to include in the story. Here, the moving images displayed in the material selecting area 300 are candidate moving images to be included in creating the story. In the case where not all the moving images can be adopted, the moving images having higher priorities may be preferentially adopted. Thus, the image editing system 200 can create a story which adopts the moving images that he or she desires to use.

The template selecting area 301 is for displaying a template which can be selected by the user. As shown in FIG. 4, for example, the displayed template which can be selected by the user includes "a people-oriented template with slow-tempo BGM", "a people-oriented template with up-tempo BGM", "a scenery-oriented template with slow-tempo BGM", and "a scenery-oriented template with up-tempo BGM". The user operates the mouse 105 to select a template. Thus, having several kinds of templates, the user can change the atmosphere of a story to be created.

The BGM user designating area 302 is for the user designating any given BGM to be used for the story. The user operates the mouse 105 to click the register button 304, so that the user can register the BGM to be used for creating the story. Furthermore, the user operates the mouse 105 to try listening to the BGM.

The determination button 303 is for the user determining the selection of a material image, a template, and BGM for creating the story. The user operates the mouse 105 to click the determination button 303, so that the user can determine the selection. When the selection for creating the story ends, the image editing system 200 creates a story based on the images selected in the material selecting area 300, the template selected in the template selecting area 301, and the BGM corresponding to the BGM information designated in the BGM user designating area 302. When the determination button 303 is clicked and a preview (also referred to as a story for preview) is created, the CPU 101 causes LCD 109 to change a display screen from the selection screen to the check screen via the display device 108. It is noted that the preview creating operation shall be described later.

Figure 5:
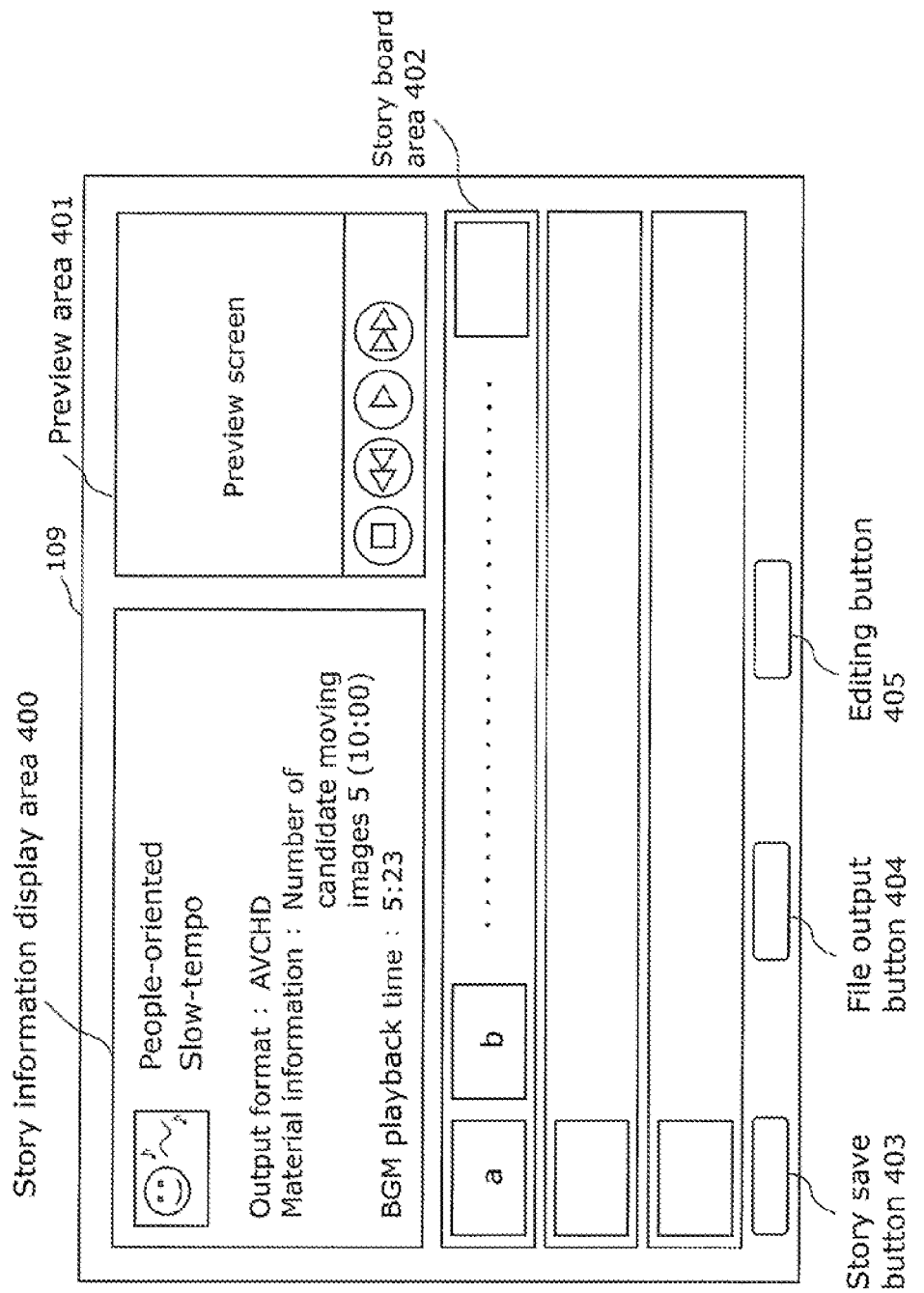
FIG. 5 depicts a check screen appearing on the LCD included in the image editing system according to the embodiment.

FIG. 5 depicts "the check screen", of the image editing system 200, appearing on the LCD 109. On "the check screen", the user checks the outcome of the created story.

As shown in FIG. 5, the check screen which appears on the LCD 109 includes a story information display area 400, a preview area 401, a story board area 402, a story save button 403, a file output button 404, and an editing button 405.

The story information display area 400 is for providing information on the details which the user selects on the selection screen.

The preview area 401 is a display area for playing back the preview created by the image editing apparatus 100 according to the embodiment. The user can check, in a form of an actual image, the details of the created story as a preview.

The preview area 401 includes a preview screen, a playback button, a fast-forward button, and a rewind button. The user can select the playback button, the fast-forward button, and the rewind button by operating the mouse 105. Accordingly, the user can cause the image editing system 200 to carry out various preview playback operations.

In other words, as shown in FIG. 2, the image editing system 200 displays, for example on the preview area 401, the image signal provided from the preview playback unit 160 included in the image editing apparatus 100 according to the embodiment.

The story board area 402 is for displaying the details of the created story. Two or more "boxes" are arranged in the story board area 402. Each of the boxes is for a corresponding one of the moving images or one of the still images included in the material images. The arrangement order of the boxes corresponds to the display order of the images in the story. The boxes, each having an image, are arranged and displayed. The images in the boxes show that each of the images selected from the images displayed in the material selecting area 300 corresponds to which box. The image editing system 200 may also have an icon overlap with a box. The icon shows the switching effect between the images. Furthermore, the image editing system 200 may have the playback time overlap with a box. The playback time is spent for displaying, in a form of a movie, each of the moving images provided to a corresponding one of the boxes. Hence, the user can employ the images of the boxes displayed in the story board area 402 in order to check which materials are arranged in which order, with which effect, and at which playback time on the story.

The user can select the story save button 403 by operating the mouse 105. The user clicks the story save button 403 to save the story information in the HDD 104. Even though it is not shown, for example, a story reading button is provided in a screen on an upper hierarchy so that the stored story information may be read on the screen.

The file output button 404 can be selected by the user operating the mouse 105. The user can create a moving image file based on the created story information by clicking the file output button 404. In other words, when the file output button 404 is clicked, the image editing system 200 creates and writes a new moving image file corresponding to the story. Here, the user may select, in advance, an output format of the moving image file to be created. In other words, when the user selects AVCHD, the image editing system 200 creates an AVCHD-complied moving image file.

The editing button 405 can be selected by the user operating the mouse 105. When the user clicks the editing button 405, the CPU 101 causes the LCD 109 to change the display screen from the check screen to the edit screen via the display device 108. In other words, when the editing button 405 is clicked, the image editing system 200 displays the edit screen.

Figure 6:
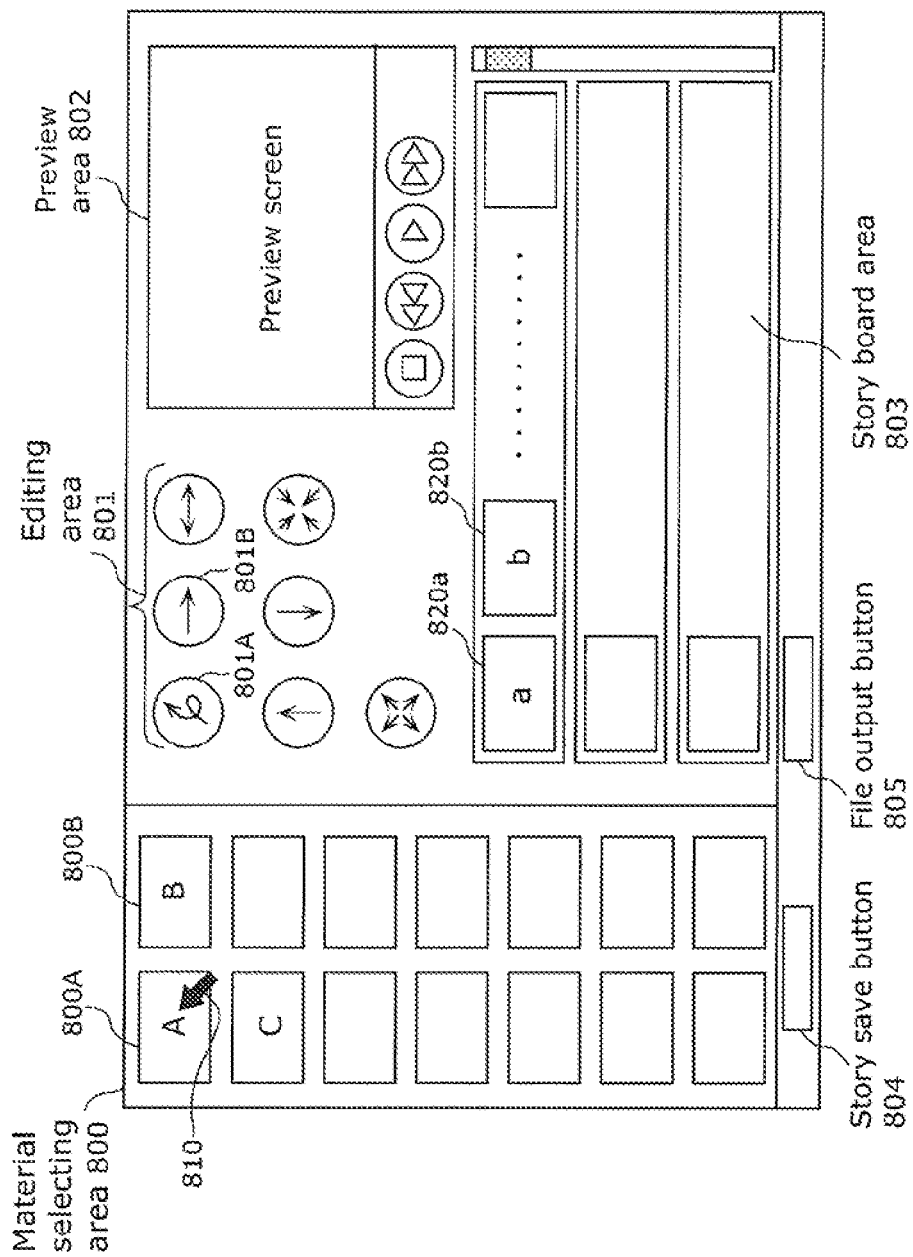
FIG. 6 depicts an edit screen appearing on the LCD included in the image editing system according to the embodiment.

FIG. 6 depicts "the edit screen", of the image editing system 200, appearing on the LCD 109. On "the edit screen", the user edits the pre-created story.

As shown in FIG. 6, the edit screen provided on the LCD 109 includes a material selecting area 800, an editing area 801, a preview area 802, a story board area 803, a story save button 804, and a file output button 805.

The material selecting area 800 is similar to the material selecting area 300 in FIG. 4, and the details thereof shall be omitted. The preview area 802 is similar to the preview area 401 in FIG. 5, and the details thereof shall be omitted. The story save button 804 and the file output button 805 are similar to the story save button 403 and the file output button 404 in FIG. 5, and the details thereof shall be omitted.

The editing area 801 is used for editing each of editing items, such as a visual effect and a switching effect, corresponding to one of the boxes (in other words, a box 820a, a box 820b . . . displayed in the story board area 803) which organize the story. By operating the mouse 105, the user can select and change the visual effect and the switching effect which he or she desires to set to each of the boxes.

The story board area 803 is for displaying the story which the user is to create. The story board area 803 has two or more boxes (the 820a, 820b . . . ) arranged, and displays an outline of the story created when the edit screen changes from the selection screen to the check screen.

The user operates the mouse 105 to drag and drop an image displayed in the material selecting area 800 onto a box of his or her desire in the story board area 803. This operation allows the image to be assigned to the chosen box in the story board area 803. When there is another image already assigned in the desired box, a new drag-and-drop image will replace the already assigned image. Operating the mouse 105, the user can also drag and drop to re-assign an already-assigned image in one of the boxes in the story board area 803 to another box. The order in which the moving images are assigned in the story board area 803 corresponds to the sequence of the story. Thus, in accordance with the change of the positions of the assigned moving images, the sequence of the story changes as well. Furthermore, the user can make the box selected using the mouse 105. By operating any of the editing items in the editing area 801 with the box selected, the user can change the visual effect and the switching effect corresponding to the selected box.

Described next is a preview creating sequence of the image editing apparatus 100 according to the embodiment.

As described above, the preview is created when the image editing system 200 changes the operation screen to be provided on the LCD 109 from the selection screen to the check screen. In other words, the image editing system 200 causes the image editing apparatus 100 to create the preview when the user confirms the display order of the material images to be included in the story.

Figure 7:
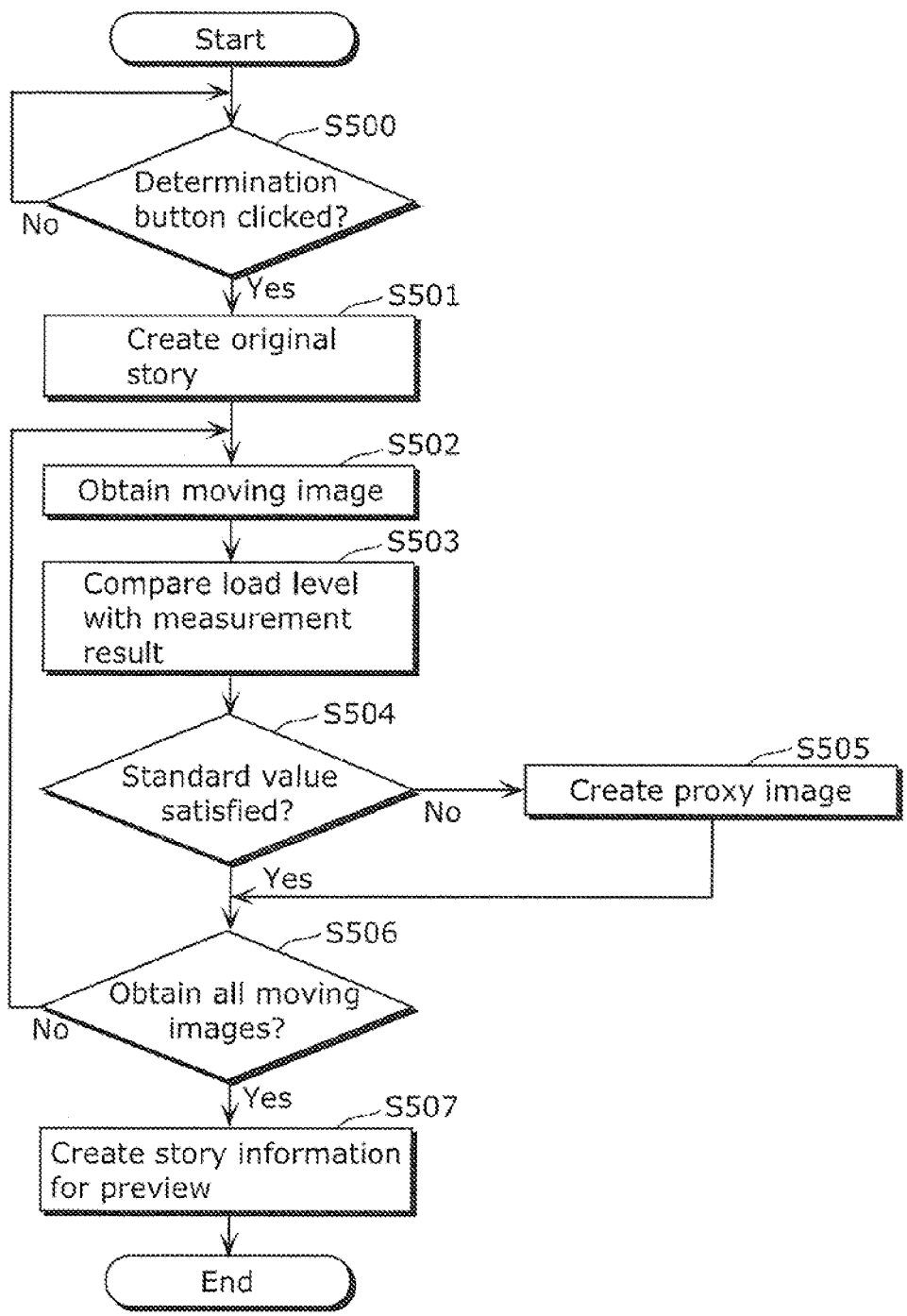
FIG. 7 depicts a flowchart showing a sequence of a process for creating a preview by the image editing apparatus according to the embodiment.

FIG. 7 depicts a flowchart showing a sequence of a process for creating a preview by the image editing apparatus 100 according to the embodiment.

First, when the user finishes selecting, on the selection screen shown in FIG. 4, a material, a template, and BGM to be used for creating a story, the user clicks the determination button 303 to confirm the selected details (S500). Until the determination button 303 is clicked, the user can carry out an operation for selecting the material, the template, and the BGM to be used for creating the story (No: S500).

When the determination button 303 is clicked, the image editing system 200 creates the story according to the confirmed selected details (S501). The story to be created is not a story for preview but an original story to be used as a base for creating the story for preview. The original story is a group of sequential images assigned according to the template based on a condition specified by the story information. Here, the file format of each of the images included in the material images is not converted by the image editing system 200.

Next, the image obtaining unit 120 included in the image editing apparatus 100 according to the embodiment obtains the material images; namely, the moving image included in the original story (S502).

Then, the converting unit 140 reads from the HDD 104 the performance level measured when the image editing system 200 is installed in the computer 90. The performance level shows the playback capacity of the preview playback unit 160. Thus, the converting unit 140 determines whether or not the preview playback unit 160 has no problem playing back each of the extracted moving images with its playback capacity.

Specifically, the converting unit 140 compares the load reference determined by the playback capacity of the preview playback unit 160 with the load level determined by the file format the resolution and the bit rate of the moving image (S503). When the load level of each of the moving images is equal to or smaller than the load reference (S504: Yes), the converting unit 140 determines that the preview playback unit 160 has no problem playing back the moving images. In contrast, when the load level exceeds the load reference (S504: No), the converting unit 140 creates a proxy image (S505).

Here, described is the load level of a moving image with reference to FIG. 8.

FIG. 8 depicts a schematic view showing a moving image file format table according to the embodiment. The moving image file format table lists a combination of a file format, a resolution, and a bit rate of a moving image which can be played back by the image editing system 200, and a load level corresponding to the file format, the resolution and the bit rate. In other words, the image editing system 200 associates each of pieces of attribute information corresponding to one of the moving images with a load level indicating a load required for playback of the moving image including the corresponding piece of the attribute information. Then, the image editing system 200 stores, in the HDD 104 and the system management memory 102, the associated pieces of attribute information and the load levels as the moving image file format table.

The listed file formats of the moving images include, for example, AVCHD, AVCHD Lite, and MOV.

Each of the listed sizes of resolutions corresponds to an associated one of the moving image file formats.

Each of the listed bit rates corresponds to an associated one of the moving image file formats and one of the resolutions.

The load level indicates a degree of the playback capacity that the preview playback unit 160 (or a degree of processing capacity of the CPU 101) has to have, so that the user can smoothly check the preview of the story. Here, "smoothly check" specifically means that no frames are dropping when a moving image is played back, and that the moving image can be played back at a predetermined frame rate.

For the sake of the explanation, the scales of the playback capacity (Levels 1 to 5) of the preview playback unit 160 correspond to the scales of each of the load levels (1 to 5) for a moving image shown in the moving image file format table.

As the load reference, used is a value indicating measured playback capacity of the preview playback unit 160.

According to the example of FIG. 8, suppose the case where an obtained moving image has the file format of AVCHD, the resolution of 1920×1080, and the bit rate of 17 Mbps. Here, the moving image file format table shows that the corresponding load level is determined to be 5. When the preview playback unit 160 has the playback capacity (the load reference) of 5, the converting unit 140 determines that no proxy image should be created for this moving image. When the load reference is equal to or smaller than 4, the converting unit 140 determines that a proxy image should be created for the moving image.

When the obtained moving image has the file format of MOV, the resolution of 640×480, and the bit rate of 15 Mbps, the corresponding load level is determined to be 2. When preview playback unit 160 has the playback capacity (the load reference) of 2, the converting unit 140 determines that no proxy image should be created for this moving image. When the load reference is equal to or smaller than 1, the converting unit 140 determines that a proxy image should be created for the moving image.

In other words, when the load reference determined by the playback capacity of the preview playback unit 160 is equal to or greater than the load level corresponding to the obtained moving image, the converting unit 140 determines that no proxy image should be created for the obtained moving image. When the load reference is smaller than the load level corresponding to the obtained moving image, the converting unit 140 determines that a proxy image should be created for the moving image.

Here, FIG. 7 is referred to again. When determining that a proxy image should be created (S504: No), the converting unit 140 creates the proxy image (S505). As the proxy image, for example, the converting unit 140 creates a file having the resolution 320×240 and the bit rate of 3 Mbps in MOV having a low playback load. As shown in FIG. 8, a moving image having the resolution of 320×240 and the bit rate of 3 Mbps in MOV is the load level 1. Hence, even though the load reference is 1, the preview playback unit 160 can display a preview which the user can smoothly check.

Here, described are the details of a proxy image creating operation carried out by the converting unit 140 in Step S505.

For a moving image having a load required for the playback greater than the load reference, the converting unit 140 converts the file format of the moving image into a file format having a smaller load required for the playback to create the proxy image.

For a moving image having a load required for the playback greater than the load reference, the converting unit 140 may convert the moving image into a moving image having a smaller resolution or a smaller bit rate to create a proxy image.

For a moving image having a load required for the playback greater than the load reference, the converting unit 140 may convert the moving image into a moving image having a load required for the playback smaller than the load reference to create the proxy image.

For a moving image having the load level greater than the load reference, the converting unit 140 may convert the moving image into a moving image having attribute information corresponding to the lowest load level among the load levels recorded in the moving image file format table to generate the proxy image.

Hereinafter, the above shall be detailed with reference to FIG. 9.

Figure 9:
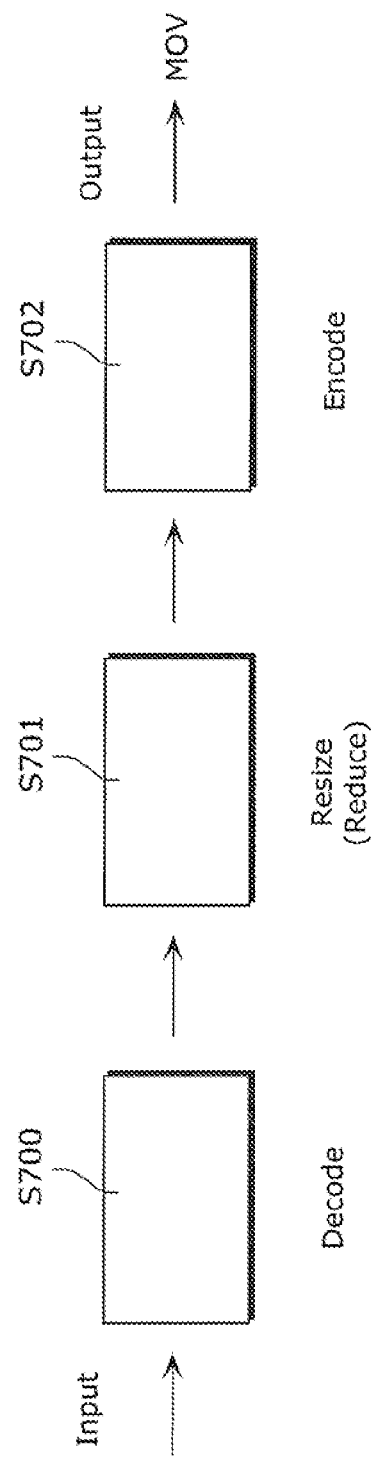
FIG. 9 depicts a flowchart showing a flow of a process for creating a proxy image by a converting unit included in the image editing apparatus according to the embodiment.

FIG. 9 depicts a flowchart showing a flow of a process for creating a proxy image by the converting unit 140 included in the image editing apparatus 100 according to the embodiment.

First, in Step S504, the converting unit 140 decodes a moving image for which the converting unit 140 determines that a proxy image needs to be created (S700).

Then, in Step S700, the converting unit 140 resizes (reduces) the moving image decoded in Step S700 in the resolution of 320×240 (S701). Next, the CPU 101 encodes the resized moving image in Step S702, so that the encoded image has a moving image format with a lower load level (S702). Here, the moving image is encoded in MOV.

The resulting moving image has the load level of 1. This moving image can be displayed by the preview playback unit 160 with no dropping frames.

It is noted that the converting unit 140 according to the embodiment converts a moving image into, as a proxy image, another moving image having the load level of 1 (a moving image having the resolution of 320×240 and the bit rate of 3 Mbps in MOV). In contrast, the converting unit 140 does not have to convert the moving image into that having the load level of 1. The converting unit 140 may convert the moving image into a moving image corresponding to any given load level equal to or smaller than the load reference (the playback capacity of the preview playback unit 160).

It is noted that the converting unit 140 does not have to execute the resizing in Step S701 when only the encoding in Step S702 can make the load level of the moving image lower than the load reference.

Those are the details of the processing carried out by the converting unit 140 in Step S505.

Here, FIG. 7 is referred to again. The image obtaining unit 120 determines whether or not all the moving images have been obtained (S506). In the case where there is an unprocessed moving image (S506: No), the image obtaining unit 120 returns to Step S502, and obtain a new moving image.

Concurrently, when the image obtaining unit 120 finishes extracting all the moving images (S506: Yes), the image editing apparatus 100 creates the story information for preview (S507).

Among the moving images specified by the story information of the original story, the moving images of which the proxy images are created have identifiers (file names, for example) of the proxy images instead of the original moving images. The story information including the identifiers of the proxy images is the story information for preview.

The preview playback unit 160 plays back each of the moving images selected as material images in the order specified by the story information. As a result, for the moving images that are materials having a playback load smaller (a load level lower) than the load reference, the preview playback unit 160 plays back the moving images without converting their file format. For the moving images that are materials having a playback load greater (a load level higher) than the load reference, the preview playback unit 160 plays back the proxy images having their file format converted into a file format with a smaller playback load, instead of playing back the material images.

Through the above operation, the image editing apparatus 100 executes the processing for the preview playback.

Described next is how the image editing system 200 causes the image editing apparatus 100 to recreate the preview when the material images included in the story are individually replaced.

On the edit screen shown in the above FIG. 6, the user can edit the already-created story to replace some of the material images used in the story. As a result of the edition, the moving images included in the story change. Thus, the image editing apparatus 100 again needs to carry out processing for the preview playback.

Figure 10:
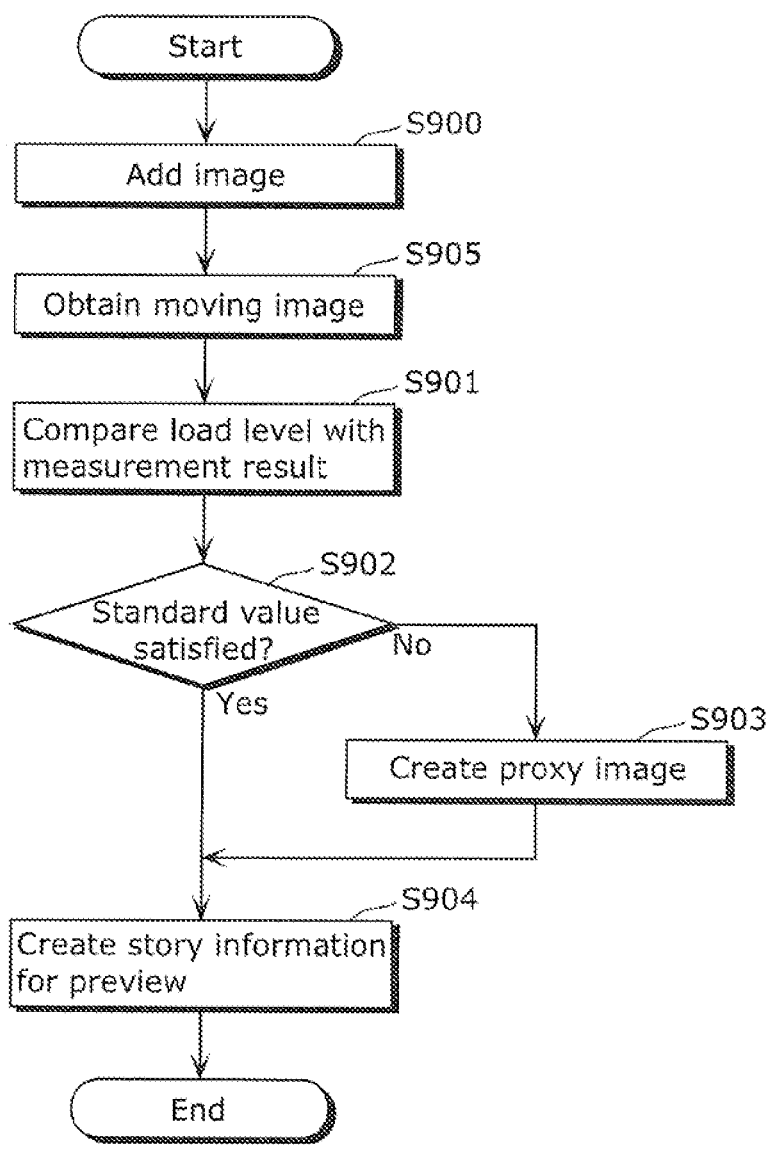
FIG. 10 depicts a flowchart showing an outline of an editing process introduced for individually-adding a material image included in a story, and performed by the image editing system according to the embodiment.

FIG. 10 depicts a flowchart showing an outline of an editing process introduced for individually adding a material image included in a story, and performed by the image editing system 200 according to the embodiment.

It is noted that the processing details in Steps S901 through S903 are similar to the operation details in Steps S503 through S505 in FIG. 7. Thus, the details thereof shall be omitted.

First, the user uses the mouse 105 to select, from the material selecting area 800, a new moving image to be added to the material images. Next, the user operates the mouse 105 to drag and drop the selected moving image onto a box of his or her desire in the story board area 803, and to assign the material in the box (S900). When there is another moving image already assigned in the desired box, the image editing system 200 replace the already assigned moving image with a newly assigned moving image.

Then, for the moving image to be replaced, the converting unit 140 determines, in Steps S902 and S903, whether or not the playback capacity of the preview playback unit 160 is equal to or higher than the load level of the moving image to be replaced (S902). As a result, when the playback capacity of the preview playback unit 160 is equal to or higher than the load level (S902: Yes), the converting unit 140 determines not to create the proxy image. Concurrently, when the playback capacity of the preview playback unit 160 is lower than the load level (S902: No), the converting unit 140 creates a proxy image (S903).

When the above replacing edition of the moving image file ends, the image editing apparatus 100 updates the story for preview (S904).

As described above, the image editing apparatus 100 according to the embodiment includes: an image obtaining unit 120 which obtains material images; a converting unit 140 which (i) carries out conversion on an image, included in the material images, of which load required for playback is greater than a predetermined load reference, and (ii) avoids carrying out the conversion on an image, included in the material images, of which load required for the playback is equal to or smaller than the load reference, the conversion additionally creating a proxy image corresponding to the image and having a smaller load required for the playback; and a preview playback unit 160 which plays back, as a preview, the proxy image and material images which are included in the material images and are other than the image corresponding to the proxy image in a predetermined order.

Hence, for an image having the playback load of the preview playback unit 160 higher than a predetermined reference, the image editing apparatus 100 can create a proxy image having a smaller playback load and playback a preview, so that the user can check a smooth preview. Concurrently, for an image having the playback load of the preview playback unit 160 higher than a predetermined reference, the preview playback unit 160 can omit creating an unnecessary proxy image in order to skip a process necessary for resizing, decoding, and encoding a moving image.

In the image editing apparatus 100 according to the embodiment, the predetermined reference is changed depending on the playback capacity of the preview playback unit 160 (in other words, the processing capacity of the CPU 101). In the case where the CPU 101 has great processing capacity, the CPU 101 changes the predetermined reference to make the proxy image more difficult to be created than a CPU having small processing capacity creates the proxy image. Thus, the creation of an unnecessary proxy image can be omitted when the processing capacity of the CPU 101 is great. In the case where the processing capacity of the CPU 101 is small, the CPU 101 can create a proxy image to playback a preview, so that the user can smoothly check the preview.

In the image editing apparatus 100 according to the embodiment, the predetermined reference is changed depending on the playback capacity of the preview playback unit 160 (in other words, the processing capacity of the CPU 101); however, the playback capacity shall not be limited to that of the preview playback unit 160. In the preview playback on the image editing apparatus, the playback capacity may be measured for an arithmetic device (may be other than the CPU 101) used for playback, and, based on the measurement result, the determination may be made on whether or not a proxy image is created.

The present invention shall not be limited to the embodiment shown above; instead, there are other embodiments. Described hereinafter are the other embodiments.

In the above embodiment, the five-second video data in AVCHD 60i is exemplified as the test data for measuring the playback capacity of the preview playback unit 160. The present invention shall not be limited by this video data. In other words, any moving image file format may be applicable as far as its test data can measure the playback capacity of the preview playback unit 160. The test data may be long or short in time period.

In the above embodiment, the editing is to replace the materials in the already-created story; however, the editing in the present invention shall not be limited to this. In other words, adding a material to the already-created story is also applicable to the present invention. When the material is added, the converting unit 140 determines whether or not a proxy image is to be created, depending whether or not the playback capacity of the preview playback unit 160 satisfies the predetermined reference.

The above embodiment has introduced a moving image. Instead, the present invention allows the user to smoothly check a preview of a still image by creating a file having a low playback load, depending whether the playback load is higher or lower than the predetermined reference. In other words, when the playback load of the still image is equal to or greater than the predetermined reference, the converting unit 140 may create a proxy image by converting the still image into a still image having a smaller playback load.

The above embodiment has exemplified that the story for preview display is not created until the conversion ends for the file format of a material having a playback load higher than the predetermined reference; instead, the user may cancel the conversion during the conversion of the file format. For a moving image still undergoing the conversion at the moment of the cancellation, the story for preview display may be created as it is.

In other words, when the user gives an instruction to cancel the conversion while the converting unit 140 is carrying out the conversion, the converting unit 140 may cancel the conversion, and the preview playback unit 160 may play back, in a predetermined order (specified by the story information), a proxy image created by the converting unit 140 until the cancelation of the conversion, and material images other than a moving image corresponding to the proxy image.

This operation allows the user who does not have to have the preview to cut the processing time required for creating the story for preview. In other words, when there is no need for preview, the original story can be immediately displayed without creating the story for preview.

It is noted that in the embodiment, the image editing apparatus 100 creates the preview when the image editing system 200 changes the operation screen to be provided on the LCD 109 from the selection screen to the check screen. However, the timing of creating the preview by the image editing apparatus 100 shall not be limited to this. For example, the image editing apparatus 100 may create the preview in one of the cases when: (i) a new moving image is added to the material images, (ii) the user confirms material images and the order of displaying the material images, and (iii) an instruction for the conversion is received from the user. Here, as the internal processing of the image editing apparatus 100, the converting unit 140 performs the following: in one of the cases when (i) a new moving image is added to the material images, (ii) the user confirms material images and the order of displaying each of the material images, and (iii) an Instruction for the conversion is received from the user. Then, the converting unit 140 determines whether or not there is a moving image in the obtained material images, the moving image which has a load required for the playback of the moving image greater than the load reference. The converting unit 140 then carries out the conversion only on the moving image having the load greater than the load reference.

It is noted that the converting unit 140 does not have to carry out the processing in Step S701 when creating the proxy image. In other words, the conversion unit 140 may encode an image only, without resizing. Furthermore, in Step S702, the converting unit 140 may encode an image and convert its file format into another file format than MOV.

It is noted that each of the units included in the image editing apparatus in the above embodiments may be configured from a single System-LSI (Large-Scale Integration). Each unit may be made as separate individual chips or as a single chip to include a part or all thereof.

Here, the System-LSI is mentioned but there are instances where, due to a difference in the degree of integration, the designations IC, LSI, super LSI, and ultra LSI are used.

Furthermore, the means for circuit integration is not limited to an LSI, and implementation with a dedicated circuit or a general-purpose processor is also available. In addition, it is also acceptable to use a Field Programmable Gate Array (FPGA) that is programmable after the LSI has been manufactured, and a reconfigurable processor in which connections and settings of circuit cells within the LSI are reconfigurable.

Furthermore, if integrated circuit technology that replaces LSI appears thorough progress in semiconductor technology or other derived technology, that technology can naturally be used to carry out integration of the constituent elements. Biotechnology is anticipated to be applied.

Moreover, part or all of the functions of the image editing apparatus according to the embodiments of the present invention may be achieved by a processor, such as a CPU, executing a computer program.

The present invention may be the computer program, and may also be a non-transitory computer-readable recording medium. The above program may be distributed via a transmission medium, such as the Internet.

Moreover, at least parts of the functions of the image editing apparatus according to the embodiments may be combined with each other.

Although only an exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

INDUSTRIAL APPLICABILITY

The present invention relates to image editing apparatuses and, in particular, to an image editing apparatus capable of editing an image. In other words, the application of the present invention shall not be limited to the image editing apparatuses. The present invention is applicable to the image editing apparatuses for cellular phones and video cameras as far as they are capable of editing images. Moreover, the present invention is applicable to storage media including CDs and DVDs storing programs which can execute similar functions.

What is claimed is:

1. An image editing apparatus comprising:
an image obtaining unit configured to obtain material images;
a converting unit configured to (i) carry out conversion on an image, included in the material images, of which load required for playback is greater than a predetermined load reference, and (ii) avoid carrying out the conversion on an image, included in the material images, of which load required for the playback is equal to or smaller than the load reference, the conversion additionally creating a proxy image corresponding to the image and having a smaller load required for the playback; and
a preview playback unit configured to play back, as a preview, the proxy image and material images which are included in the material images and are other than the image corresponding to the proxy image in a predetermined order.

2. The image editing apparatus according to claim 1,
wherein said converting unit is configured to determine the load reference based on the playback capacity, of said preview playback unit, which is previously measured.

3. The image editing apparatus according to claim 2,
wherein said converting unit is configured to determine the load reference such that the load reference is greater as the playback capacity is higher.

4. The image editing apparatus according to claim 1,
wherein, for an image having a load required for the playback greater than the load reference, said converting unit is configured to convert a file format of the image into a file format having a smaller load required for the playback to create the proxy image.

5. The image editing apparatus according to claim 1,
wherein, for an image having a load required for the playback greater than the load reference, said converting unit is configured to convert the image into an image having a smaller resolution or a smaller bit rate to create the proxy image.

6. The image editing apparatus according to claim 1,
wherein, for an image having a load required for the playback greater than the load reference, said converting unit is configured to convert the image into an image having a load required for the playback smaller than the load reference to create the proxy image.

7. The image editing apparatus according to claim 1,
wherein said converting unit is configured to (i) store in association with each of pieces of attribute information corresponding to one of images including the image and a corresponding one of load levels indicating a load required for playback of the one image including the corresponding piece of the attribute information, and, for an image having the one load level greater than the load reference, (ii) convert the image into an image having one of the pieces of the attribute information corresponding to a lowest load level among the load levels to generate the proxy image.

8. The image editing apparatus according to claim 1,
wherein said converting unit is configured to (i) determine whether or not there is the image, of which load required for the playback is greater than the load reference, in the obtained material images, and (ii) carry out the conversion only on the image having the load greater than the load reference, the determination being carried out in one of cases when (i) a new image is added to the material images, (ii) a user confirms the material images and an order of displaying the material images, and (iii) said converting unit receives an instructions from the user.

9. The image editing apparatus according to claim 1,
wherein, when a user gives an instruction to cancel the conversion while said converting unit is carrying out the conversion, said converting unit is configured to cancel the conversion, and
said preview playback unit is configured to play back the proxy image and the material images other than the image corresponding to the proxy image in the predetermined order, the proxy image being created by said converting unit until the cancelation of the conversion.

10. An image editing system comprising:
said image editing apparatus according to claim 1; and
an original story creating unit configured to play back each of images included in the material images in the predetermined order.

11. An image editing method comprising:
obtaining material images;
(i) carrying out, using a processor, conversion on an image, included in the material images, of which load required for playback is greater than a predetermined load reference, and (ii) avoiding carrying out the conversion on an image, included in the material images, of which load required for the playback is equal to or smaller than the load reference, the conversion additionally creating a proxy image corresponding to the image and having a smaller load required for the playback; and playing back, as a preview, the proxy image and material images which are included in the material images and are other than the image corresponding to the proxy image in a predetermined order.

12. A non-transitory computer-readable recording medium having stored thereon a program which causes a computer to execute an image editing method comprising:

obtaining material images;

(i) carrying out conversion on an image, included in the material images, of which load required for playback is greater than a predetermined load reference, and (ii) avoiding carrying out the conversion on an image, included in the material images, of which load required for the playback is equal to or smaller than the load reference, the conversion additionally creating a proxy image corresponding to the image and having a smaller load required for the playback; and playing back, as a preview, the proxy image and material images which are included in the material images and are other than the image corresponding to the proxy image in a predetermined order.

13. An integrated circuit comprising:

an image obtaining unit configured to obtain material images;

a converting unit configured to (i) carry out conversion on an image, included in the material images, of which load required for playback is greater than a predetermined load reference, and (ii) avoid carrying out the conversion on an image, included in the material images, of which load required for the playback is equal to or smaller than the load reference, the conversion additionally creating a proxy image corresponding to the image and having a smaller load required for the playback; and a preview playback unit configured to play back, as a preview, the proxy image and material images which are included in the material images and are other than the image corresponding to the proxy image in a predetermined order.

* * * * *